Sept. 28, 1937.  T. F. DWYER, JR  2,094,569
EQUALIZER SPRING CAP AND SEAT
Filed April 2, 1936
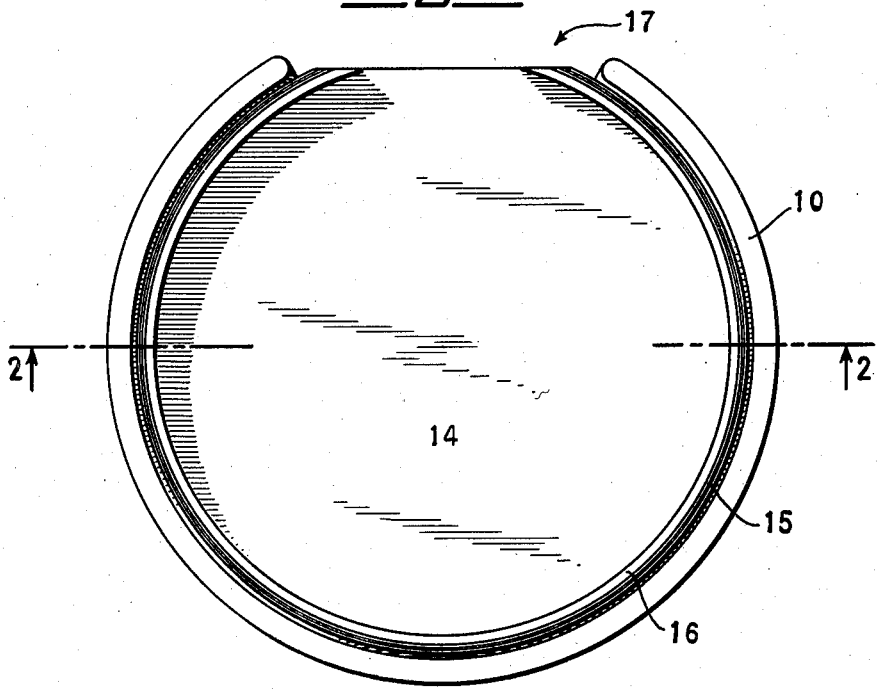
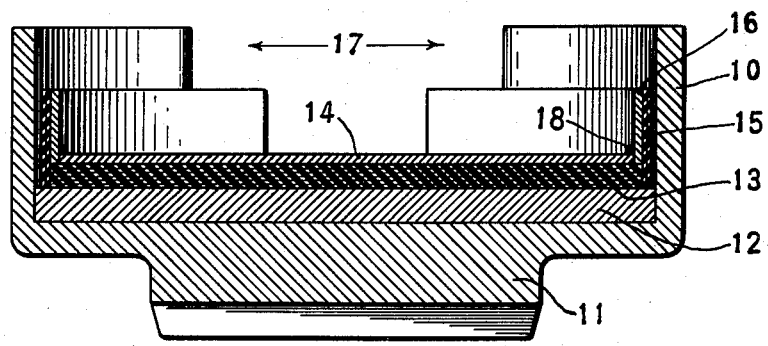
INVENTOR
THOMAS F. DWYER, JR.,
BY
ATTORNEY Patented Sept. 28, 1937

2,094,569

UNITED STATES PATENT OFFICE 2,094,569

EQUALIZER SPRING CAP AND SEAT

Thomas Francis Dwyer, Jr., Cambridge, Mass., assignor to Fabreeka Products Company, Inc., Boston, Mass., a corporation of Massachusetts Application April 2, 1936, Serial No. 72,263

5 Claims. (Cl. 267—4)

This invention relates to caps for coil springs, especially equalizer springs on a railway car, and has for its object to provide a device capable of deadening sound and vibrations between the spring and the member at each end thereof.

Another object is to assist in keeping the springs in position without impeding their normal movements or magnifying the sound in event a spring might be displaced laterally.

Referring to the drawing

Fig. 1 is a top plan view of one embodiment of this invention.

Fig. 2 is a section on the line 2—2 of Fig. 1.

A steel cup-shaped member 10 of the form illustrated is provided with a thickened base or lug shaped to provide a centering attachment to the equalizer bars or truck frame, as will be understood by those skilled in the art. Within the cup-shaped member 10 is a steel disc about ½ inch thick. The thickness of this disc depends on the size of spring used. Contiguous the disc 12 is a layer of shock absorbing and sound deadening material 13 preferably of a sort capable of yielding without great resiliency.

Due to live rubber being too resilient and too well adapted to transmit harmonic vibrations, the pad 13 is less lively and capable of slowly returning under impact. In other words, its recoil under shock is comparatively slow so that it is not readily adapted to vibrate as freely as is rubber yet it is capable of absorbing shocks and sounds. One kind of material appropriate for this purpose includes a laminated fabric pad having between some of the layers a thin wash coat of rubber. Between the end of the spring, not shown, and the shock absorbing pad 13 is a steel washer 14 about ⅛ of an inch thick.

To deaden the sound vibrations which might be transmitted laterally another pad 15 of similar shock absorbing material, though not necessarily as thick as the pad 13, is placed between the sides of the cup member 10 and the sides of the spring. Intermediate the pad 15 and the sides of the spring is a ring 16 preferably welded at 18 to the plate 14. The metal parts 14 and 16 are secured by some well known flexible or plasticized resinous or other adhesive or may be vulcanized to the shock absorbing materials 13 and 15. The inner plates and yieldable materials thus constitute a unit which is capable of slight lateral movement within the cup should the spring become displaced with respect to the cup member.

The device shown in the drawing has one side cut away at 17 to provide clearance for the truck frame or equalizer bar.

A device of the type illustrated is preferably placed at each end of the equalizer or other coil springs and under the usual dimensions for such springs the inside diameter of the cup shaped member 10 is about 9⅝ inches, there being about 1/16 of an inch clearance between the pad 15 and the inner surface of the side wall of the cup member 10. In practice it has been found the shock absorbing pad 13 should be at least about ¼ of an inch thick and greater thickness has been found more satisfactory, a pad of about 1¼ of an inch thickness having been used in one installation.

The pad 15 need not be as thick and in fact has been made only about 1/16 of an inch thick. The metal plates 14 and 16 assist in distributing any pressure applied to the shock absorbing material and therefore increases the effectiveness and sound deadening character.

Specifically the shock absorbing pads referred to comprise woven cotton duck layers impregnated with a rubber compound. Between some of the layers is a very thin layer of rubber, preferably only a small fraction of an inch in thickness, such as a fiftieth of an inch. There are only a few layers of rubber between some and not all of the fabric layers so that by far the major portion of the thickness of the pad is due to the fabric. The edges and the faces of the pad wherever exposed may be coated with a water and grease repellent material, if desired, to protect the soft vulcanized rubber from oxidation.

The shock absorbing material for the bottom and sides of the cup-shaped cap might be made in a single piece where the dimensions permit instead of in two pieces as illustrated in the drawing. Where this material is made in a single cup-shaped piece, the material on the sides of the cup will be of the same thickness as that on the bottom.

The effect of the shock absorbing material used at each end of the spring is believed to introduce a compound vibration instead of a simple vibration of the spring, and the slow recoil characteristic of the shock absorbing material is believed to contribute to this effect.

Heretofore equalizer springs have set with use and it has been customary to place metal shims at either or both ends of the spring to maintain the proper level of the car floor. With the present invention the use of shims of the same shock absorbing material as is here used is believed to be preferable instead of the use of metal shims.

I claim:

1. A vibration dampening cap for a coil spring comprising a metal cup having a substantially flat base and generally cylindrical sides, a pad of shock absorbing material on the base and another pad of shock absorbing material arranged around the inside of the cup side walls, a metal plate on the opposite side of the pad from the bottom of the cup, a metal rim inside the pad around the inside of the cup and welded to said plate.

2. A vibration dampening cap for a coil spring comprising a metal cup having a substantially flat base and generally cylindrical sides, a pad of shock absorbing material on the base, another pad of shock absorbing material arranged around the inside of the cup side walls, a metal plate on the opposite side of the pad from the bottom of the cup, and a metal rim inside the pad around the inside of the cup and welded to said plate, there being normally a clearance between the coil spring and the said metal side rim.

3. A cap for the end of an equalizer coil spring on a railway car comprising a pad of shock absorbing material between metal plates, said material being thick enough to be slightly compressible under load but not permanently lifeless, and also adapted to dampen noise and suppress sympathetic vibrations through its characteristic of slow recoil from shock, a layer of shock absorbing material on the sides of said spring and between curved metal plates, said side plates being connected with the corresponding bottom plates, the outer side and bottom plates being integral and the inner side and bottom plates having been welded together around the inside of their junction, the outer side and bottom plates having cut away portions on one side and the inner side plate and side layer of shock absorbing material extending angularly a greater distance around the periphery of the equalizer spring than does the outer side plate, but not extending radially substantially beyond the outer surface of said outer plate, the outer side and bottom plates being substantially thicker than the inner side and bottom plates.

4. A cap for the end of an equalizer coil spring on a railway car comprising a metal cup having a bottom and side walls, a pad of shock absorbing material on the bottom and around the sides of the cup on the inside, a metal plate over said material on the bottom of the cup to receive the thrust of the spring, and a metal side wall around and within the material on the sides of the cup to prevent the spring from chafing the shock absorbing material, said shock absorbing material on both the sides and the bottom of the cup entirely spacing the inner metallic parts from the outer metallic parts and having a recoil characteristic substantially slower than that of live rubber and materially different from that of the spring alone whereby a compound vibration results in said spring to reduce any tendency for the spring to attain its natural period of vibration or a condition of resonance.

5. A cap for the end of an equalizer coil spring on a railway car comprising an outer metal cup, a pad of shock absorbing material on the base and around the sides of the cup on the inside, said material being laminated and including layers of fabric impregnated with resilient compound, a metal cup member within the shock absorbing material whereby the equalizer spring convolutions within the shock absorbing material are movable against a metal surface, said inner and outer metal cups being completely insulated from each other by the intervening shock absorbing material.

THOMAS FRANCIS DWYER, Jr.